Feb. 24, 1970  C. B. RICHEY  3,497,232
DROP BED TRAILER
Filed Nov. 22, 1967  3 Sheets-Sheet 1

INVENTOR.
CLARENCE B. RICHEY
BY
Tweedale & Gerhardt
ATTORNEYS.

Feb. 24, 1970   C. B. RICHEY   3,497,232
DROP BED TRAILER
Filed Nov. 22, 1967   3 Sheets-Sheet 2
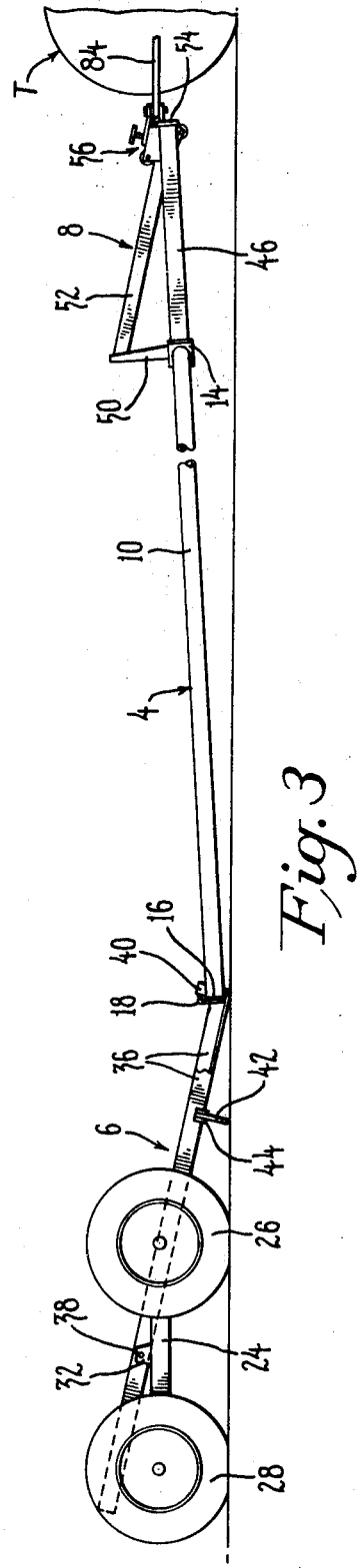
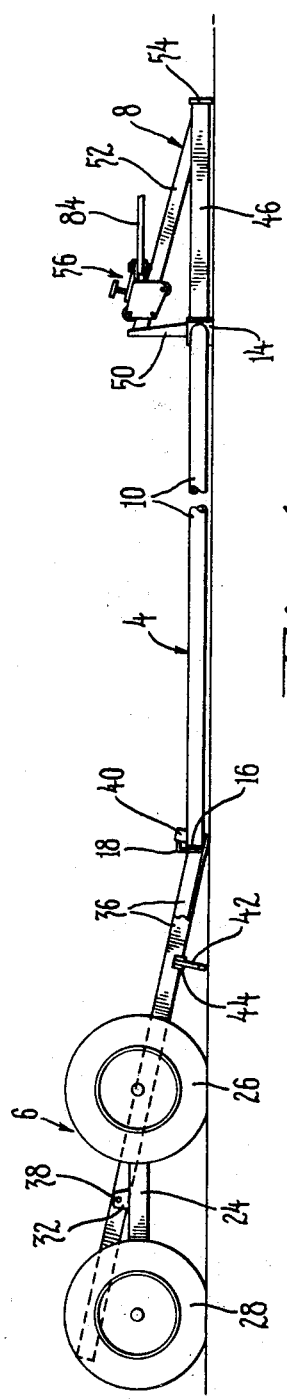
INVENTOR.
CLARENCE B. RICHEY
BY
Tweedale & Gerhardt
ATTORNEYS.

United States Patent Office 3,497,232
Patented Feb. 24, 1970

3,497,232
DROP BED TRAILER
Clarence B. Richey, Fresno, Calif., assignor to
Massey-Ferguson Inc., Detroit, Mich.
Filed Nov. 22, 1967, Ser. No. 684,979
Int. Cl. B62d *21/14*
U.S. Cl. 280—43.11                          13 Claims

ABSTRACT OF THE DISCLOSURE

A trailer having a load carrying bed slideably supported on a wheeled, tiltable carriage so that the rear end of the bed can slide to the forward end of the carriage and rest on the ground. A hitch frame having a downwardly and forwardly sloping track member is mounted on the front end of the bed and a movable connector is mounted on the track. When the connector is secured to a drawbar and maintained at a fixed height above the ground, forward movement of the drawbar causes the connector to move to the lower end of the track member and lift the front end of the bed off the ground. Then, with the connector and wheels locked, the rear end of the bed may be raised onto the carriage by rearward movement of the draft vehicle.

BACKGROUND

Field of the invention

This invention relates to trailers or carriers for transporting farm implements and the like, and is particularly concerned with such trailers having a load supporting bed that can be lowered onto the ground for loading and unloading, and can be raised above the ground for transport.

Description of the prior art

U.S. Patent 3,179,271 of J. C. Donahue, dated Apr. 20, 1965, discloses a carrier for farm implements and the like having a bed portion slideably supported on a wheeled, tiltable carriage portion. When the wheels are locked against rotation, the bed portion can be pulled forward until the rear of the bed portion slides to the front of the carriage portion. As the bed portion slides forward on the carriage portion, the carriage portion tilts forward and the rear end of the bed portion slides down the tilted carriage portion to the ground. The front end of the bed portion can be manually jacked up and down to raise and lower it relative to the ground. Consequently, a load can be placed on the bed portion when it rests on the ground, and the bed portion can then be raised at the front by the manual jack and can be connected with a tractor or similar draft vehicle. With the wheels locked against rotation, rearward movement of the tractor causes the rear end of the bed portion to slide up the tilted carriage portion until the entire bed is raised to a transport position and the carriage portion assumes a horizontal position.

SUMMARY OF THE INVENTION

An object of this invention is to provide a trailer having a load supporting bed that can be lowered onto the ground for loading and unloading, and can be raised above the ground for transport by movement of the towing vehicle to which the trailer is attached.

Another object is to provide a trailer with a hitch frame including a connector for connection with the drawbar of a draft vehicle, the connector being movable on the hitch frame by the drawbar to cause the hitch frame to be raised and lowered relative to the ground.

Another object lies in the provision of a hitch frame rigidly connected with a trailer or implement having an inclined track member supporting a connector so that as the connector is caused to move from one end to the other of the track member by a drawbar maintaining the connector at a fixed height above the ground, the hitch frame will be raised and lowered relative to the ground.

The foregoing, and other objects, are achieved by the provision of a trailer having a load supporting bed slideably carried on a wheeled, tiltable carriage, and having a hitch frame rigidly projecting from its forward end for connection with a draft vehicle. The carriage wheels may be selectively locked against rotation. The hitch frame has a downwardly and forwardly sloping track member. Mounted on the track member for movement between the ends thereof is a connector including a trolley which carries a clevis for connection with the draft vehicle drawbar.

When the clevis is connected with the drawbar and the trolley is located at the rear, upper end of the track member, the front end of the bed rests on the ground. When the clevis is pulled forward by the vehicle, the front end of the track member is forced to raise the hitch frame, and the front end of the bed is raised to approximately the height of the drawbar when the trolley is at the lower, front end of the track member. Thus, the front end of the bed is raised and lowered for transport, and for loading and unloading respectively, by moving the draft vehicle forwardly or rearwardly relative to the hitch to shift the position of the trolley and clevis on the track member.

The rear end of the bed portion is raised and lowered by the vehicle by pulling the rear end of the bed portion to the front end of the carriage thereby causing the carriage to tilt forward and lower the rear end of the bed onto the ground. Conversely, backing the vehicle causes the rear end of the bed portion to move from the ground rearwardly and upwardly until the carriage tilts back to its horizontal position and the bed is in its transport position.

DRAWINGS

FIGS. 3 and 4 are views similar to FIG. 1 sequentially illustrating the movement of the bed from its transport to its lowered, unloading position;

Figure 1:
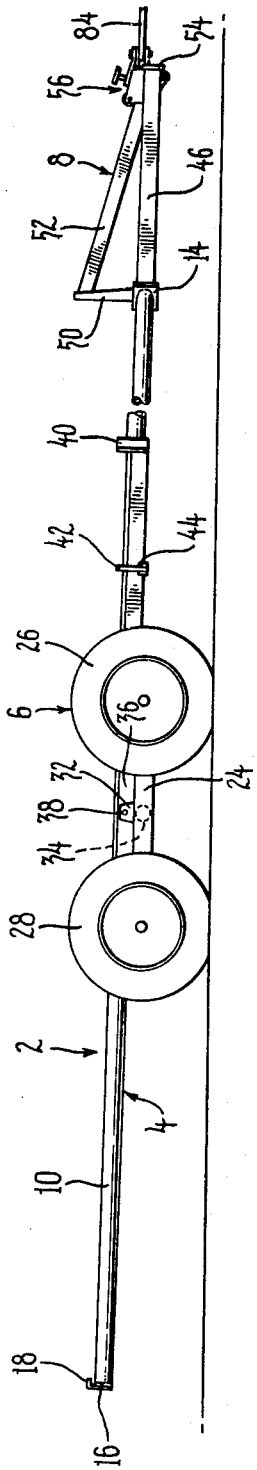
FIG. 1 is an elevational view of a trailer embodying the invention with the bed in its raised, transport position.

With reference to FIGS. 1–4 the trailer is designated collectively by reference numeral 2 and includes a load supporting bed 4, a carriage 6, and a hitch assembly 8.

The bed 4 includes a pair of spaced, parallel side frame members 10 and a front transverse frame member 12 which is joined at its ends to the front end of side frame members 10 by attachment plates 14. Side frame members 10 and front frame member 12 in the illustrated embodiment are made up of tubular members. The rear ends of the side frame members are secured together by a transverse rear frame member 16 in the form of an angle section. Welded onto each end of the transverse rear frame member 16 are upwardly projecting abutment members 18. Extending between the front and rear frame members and overlying a plurality of transverse slats or cross frame members 22 are floor members 20.

The carriage 6 includes a pair of spaced, parallel, fore and aft extending support bars 24 on which are mounted front wheels 26 and rear wheels 28 in tandem fashion. Each of the wheels may be provided with wheel locking assemblies including a notched index plate 30 cooperable with a pivoted lock bar 31 of the type disclosed in U.S. Patent 3,179,271. Projecting upwardly from each of the support bars 24 are support brackets 32, and a tubular cross member 34 extends transversely between the support bars beneath brackets 32. Pivotally mounted on each of the support brackets 32 by pins 38 are side rails 36 for the carriage in the form of angle sections. Welded to the forward, outer edge of each of the side rails 36 is a stop member 40 which cooperates with the associated abutment member 18 at the rear of the bed as shown in FIGS. 3 and 4 to prevent horizontal disengagement of the bed from the rails. Pivotally mounted on brackets 44 on the outer side of the side rails are bed securing straps 42 which, in the transport position shown in FIGS. 1 and 2, overlie the side rails 10 to secure the bed vertically on the carriage.

Figure 5:
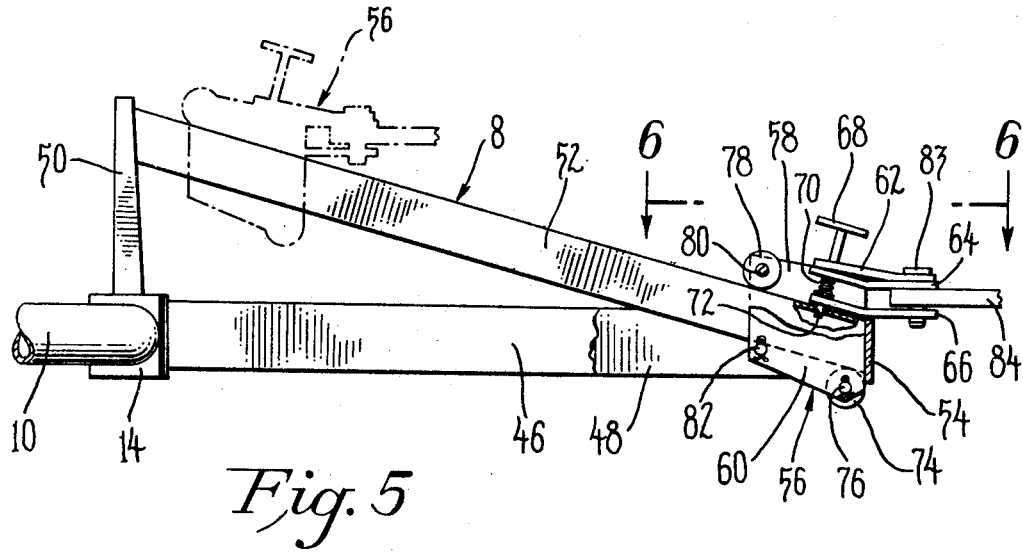
FIG. 5 is an enlarged elevational view, partially in section, of the hitch.
Figure 6:
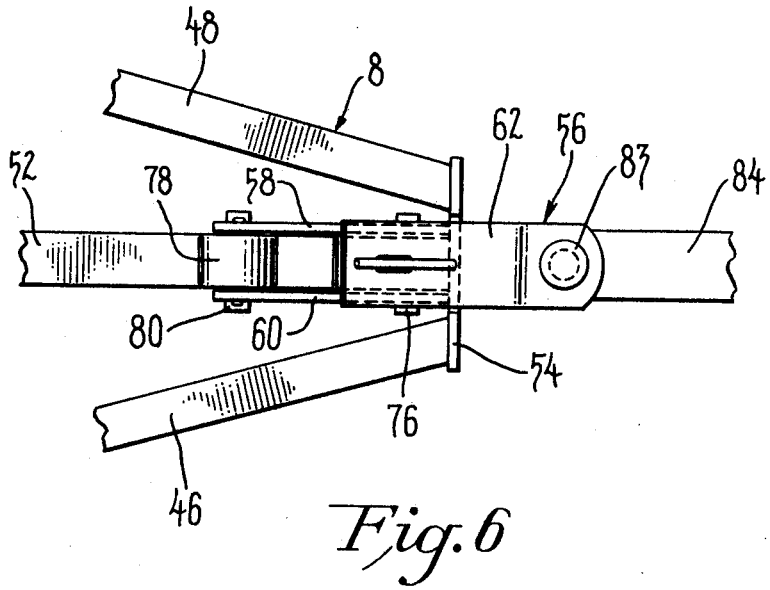
FIG. 6 is a view taken on line 6—6 of FIG. 5.

The hitch frame assembly 8 includes forwardly converging hitch frame members 46 and 48, an upright support member 50 mounted on the front transverse frame member 12, and a downwardly and forwardly sloping track member 52 of rectangular cross-section extending between the upper end of support 50 and an attachment plate 54 at the forward ends of members 46, 48 and 52 (FIGS. 5 and 6). Collectively designated by reference numeral 56 is a connector mounted on track member 52 for travel between the broken line and full line positions in FIG. 5. The connector 56 includes a trolley made up of side plates 58 and 60, a top plate 62, and rollers 74 and 78 engaged respectively with the upper and lower sides of track member 52. Rollers 74 and 78 are mounted respectively on pins or shafts 76 and 80, and a pin or rod 82 is mounted between the lower rear edges of plates 58 and 60. Supported beneath the cover plate 62 is a clevis made up of apertured plates 64 and 66 welded to side plates 58 and 60 which project forwardly to receive a pin 83 to couple the clevis with the drawbar 84 of a tractor T (FIG. 1). Plunger 68 is spring loaded in a downward direction by a spring 70 seated between the upper clevis plate 64 and a flange on plunger 68. In the position shown in full lines in FIG. 5, the clevis is locked in its transport position by engagement of plunger 68 with an aperture 72 in the top wall of track member 52. By raising the plunger against the force of spring 70, the trolley is free to move from the full line position in FIG. 5 to the broken line position.

Figure 2:
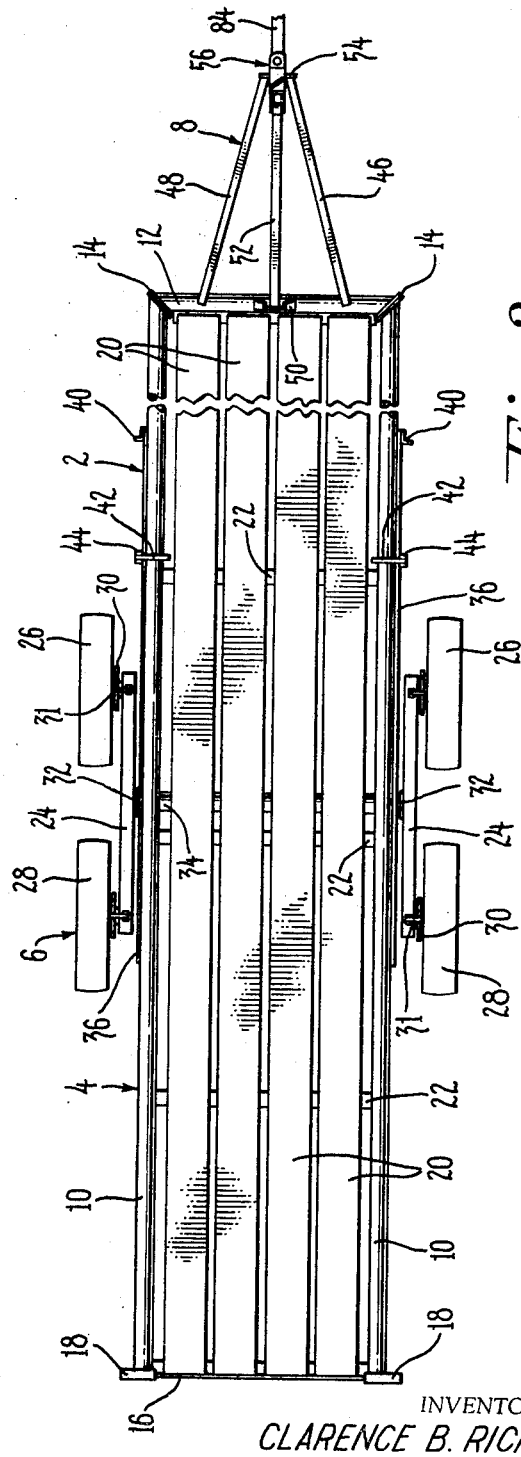
FIG. 2 is a plan view of the trailer of FIG. 1.

FIGS. 1 and 2 illustrate the trailer in its full transport position, with the connector 56 located at the forward, lower end of track member 52 and connected with the drawbar 84 of the towing vehicle T. Connector 56 is maintained at a fixed height above the ground by drawbar 84. Thus, by backing the vehicle toward the left as shown in FIG. 1, with plunger 68 released from aperture 72, the connector 56 will be forced by movement of the vehicle to the broken line position shown in FIG. 5 near the upper end of the track member, which movement will force the front end of the bed downwardly until it rests on the ground. Conversely, forward movement of the vehicle with the connector 56 in its upper rear position as shown in FIG. 4, causes the connector 56 to travel toward the lower forward ends of track member 52, and such movement causes the front end of the bed to be raised off the ground until it assumes the position shown in FIG. 3.

To lower the bed entirely to the ground, from the transport position shown in FIGS. 1 and 2, the bed securing straps 42 are moved out of engagement with side frame members 10 and wheels 26 and 28 are locked or otherwise secured against rotation. The vehicle is then moved forwardly until the rear end of the bed moves past the tilt axis of pins 38 to cause the side rails to tilt forwardly and downwardly. Continued movement of the vehicle toward the right causes the rear end of the bed to slide down the rails until it reaches its ground engaging position shown in FIGS. 3 and 4. Movement of the bed off of the rails is prevented by engagement of abutments 18 with stop members 40.

Then, with the wheels remaining locked, plunger 68 is released from hole 72, and the vehicle is backed toward the bed until the trolley of connector 56 moves up the track to the position shown in FIG. 4 to force the front end of the bed onto the ground.

When the bed is unloaded or reloaded, the vehicle may be moved forward to lift the front end of the vehicle to the position shown in FIG. 3 due to the interaction between the trolley rollers 74 and 78 and track member 52. When plunger 68 is locked in position at hole 72, the vehicle is then placed in reverse and moves toward the left as viewed in FIG. 3 to force the rear end of the bed portion to slide up rails 36. When the rear end of the bed portion moves to the rear of the pivot axis at 38, the carriage tilts in a counterclockwise direction as viewed in FIG. 3 until it assumes a horizontal position and the bed is elevated to its transport position as shown in FIG. 1.

While a specific form of the invention has been illustrated and described in the foregoing specification and drawings, it should be understood that the invention is not limited to the exact construction shown, but that various alterations and modifications in the construction and arrangement of parts is possible without departing from the scope and spirit of the invention.

What is claimed is:

1. A trailer comprising: a tiltable, wheeled carriage; a load supporting bed slideably supported on said carriage for movement between a transport position in which the rear end of the bed is located to the rear of the tilt axis of the carriage and is supported above the ground by the carriage, and a loading and unloading position in which the rear end of the bed is located forwardly of the tilt axis of the carrier and rests on the ground; a hitch frame projecting from the front end of the bed and including a track portion extending downwardly and forwardly from a point located above the front end of the bed to a point located substantially in the plane of the bed; and a connector mounted on the track member for movement between the ends thereof.

2. A trailer as claimed in claim 1 wherein said connector includes a trolley supported by rollers on the track member, and a clevis carried by said trolley for connection with the drawbar of a draft vehicle.

3. A trailer as claimed in claim 1 wherein said carriage comprises a pair of laterally spaced, fore and aft extending support bars, a pair of ground engaging wheels spaced fore and aft on each of said support bars, a cross-member extending between said support bars, and a pair of laterally spaced, fore and aft extending rails pivotally mounted above said cross-member each to one of said support bars about the tilt axis for slideably receiving said load supporting bed.

4. A tractor-trailer combination comprising a tractor having a drawbar projecting rearwardly therefrom; a trailer comprising ground engaging wheels, a load supporting bed, means supporting the bed on said wheels such that the bed can be raised above and lowered onto the ground, a hitch frame projecting forwardly from the front end of the bed and including a downwardly and forwardly inclined track member, a connector movably mounted on the track member for travel between the upper rear end of the track and the lower front end thereof, and means coupling the connector with the drawbar at a fixed height relative to the ground such that movement of the connector toward the front end of the track member raises the front end of the bed and movement of the connector toward the rear of the track member lowers the front end of the bed.

5. A tractor-trailer combination as claimed in claim 4 wherein said connector includes a trolley member having a pair of side plates, upper and lower rollers mounted between the side plates for respective engagement with the upper and lower surfaces of the track member, a clevis mounted between the side plates, and said coupling means comprising a pin pivotally connecting the clevis with the drawbar.

6. A tractor-trailer combination as claimed in claim 5 further including a locking plunger on said trolley member, and an aperture in said track member for selectively receiving the plunger to lock the connector at the lower, front end of the track member.

7. A tractor-trailer combination as claimed in claim 6 wherein said hitch frame includes a pair of forwardly converging hitch frame members having their rear ends rigidly mounted at laterally spaced locations on the front end of the bed, an upright support member rigidly mounted on the front end of the bed between said forwardly converging hitch frame members, said track member having its rear end supported on the upright member adjacent the upper end thereof, and an attachment plate connecting the forward ends of said track member and forwardly converging hitch frame members.

8. A tractor-trailer combination as claimed in claim 7 wherein said means supporting the bed on said wheels comprises a pair of rails pivotal about a transverse axis, said bed being slideably supported on the rails such that movement of the rear end of the bed forward of said transverse axis tends to cause the rails to tilt downwardly and forwardly so that continued forward movement of the bed will cause the rear end thereof to slide down the rails onto the ground.

9. A tralier comprising ground engaging wheels, a load supporting bed, means supporting the bed on the wheels for tilting movement about a transverse horizontal axis, a hitch frame projecting forwardly from the front end of the bed, said hitch frame including a downwardly and forwardly inclined track member, and a connector movably mounted on the track member for travel between the upper, rear end of the track member and the lower front end thereof having means for connecting the hitch frame with the drawbar of a towing vehicle through said movable connector for raising and lowering the front end of the trailer by moving the connector along said track member at a fixed height above the ground.

10. A trailer as claimed in claim 9 wherein said connector includes a trolley member having a pair of side plates, upper and lower rollers mounted between the side plates for respective engagement with the upper and lower surfaces of the track member, and said means for connecting comprising a clevis mounted between the side plates.

11. A trailer as claimed in claim 10 further including a locking plunger on said trolley member, and an aperture in said track member for selectively receiving the plunger to lock the connector at the lower, front end of the track member.

12. A trailer as claimed in claim 11 wherein said hitch frame includes a pair of forwardly converging hitch frame members having their rear ends rigidly mounted at laterally spaced locations on the front end of the bed, an upright support member rigidly mounted on the front end of the bed between said forwardly converging hitch frame members, said track member having its rear end supported on the upright member adjacent the upper end thereof, and an attachment plate connecting the forward ends of said track member and forwardly converging hitch frame members.

13. A trailer as claimed in claim 12 wherein said means supporting the bed on said wheels comprises a pair of rails pivotal about a transverse axis, said bed being slideably supported on the rails such that movement of the rear end of the bed forward of said transverse axis tends to cause the rails to tilt downwardly and forwardly so that continued forward movement of the bed will cause the rear end thereof to slide down the rails onto the ground.

References Cited
UNITED STATES PATENTS

| | | |
|---|---|---|
| 2,412,971 | 12/1946 | Davidson. |
| 2,969,989 | 1/1961 | Struthers _____ 280—43.11 |
| 3,179,271 | 4/1965 | Donahue _____ 214—506 |
| 3,232,464 | 2/1966 | Bogh et al. _____ 214—505 X |

LEO FRIAGLIA, Primary Examiner

U.S. Cl. X.R.

280—400; 214—506